(12) United States Patent
Shields

(10) Patent No.: US 7,602,909 B1
(45) Date of Patent: Oct. 13, 2009

(54) SELF-SERVICE TERMINAL

(75) Inventor: Adrian Shields, Fife (GB)

(73) Assignee: NCR Corporation, Dayton, OH (US)

( * ) Notice: Subject to any disclaimer, the term of this patent is extended or adjusted under 35 U.S.C. 154(b) by 1229 days.

(21) Appl. No.: 09/570,622

(22) Filed: May 15, 2000

(30) Foreign Application Priority Data

Jun. 30, 1999 (GB) ................. 9915122.7

(51) Int. Cl.
*H04L 9/00* (2006.01)

(52) U.S. Cl. ..................................... 380/42

(58) Field of Classification Search ............ 380/35–37, 380/28, 43, 44–47, 259–266, 42, 281; 902/1, 902/18, 21, 22, 14, 2; 705/43; 713/200–202, 713/165, 167, 189, 193
See application file for complete search history.

(56) References Cited

U.S. PATENT DOCUMENTS

| 4,438,824 | A | * | 3/1984 | Mueller-Schloer | ......... 713/185 |
| 4,731,842 | A | * | 3/1988 | Smith | .......................... 705/71 |
| 4,870,612 | A | * | 9/1989 | Wigur | .......................... 380/42 |
| 5,003,597 | A | * | 3/1991 | Merkle | .......................... 380/37 |
| 5,222,624 | A | | 6/1993 | Burr | |
| 5,381,480 | A | * | 1/1995 | Butter et al. | .................. 380/37 |
| 5,809,143 | A | * | 9/1998 | Hughes | ....................... 705/77 |
| 5,969,319 | A | * | 10/1999 | Wallner | ...................... 235/380 |
| 6,041,412 | A | * | 3/2000 | Timson et al. | ............... 713/200 |
| 6,445,794 | B1 | * | 9/2002 | Shefi | ........................... 380/46 |
| 6,490,354 | B2 | * | 12/2002 | Venkatesan et al. | .......... 380/43 |

FOREIGN PATENT DOCUMENTS

| EP | 0272230 | | 6/1988 |
| EP | 0854456 | A1 * | 7/1998 |
| GB | 2168514 | | 6/1986 |
| JP | 334323 | | 12/1998 |
| JP | 57430 | | 2/2000 |
| WO | 9712344 | | 4/1997 |

OTHER PUBLICATIONS

IBM Technical Disclosure Bulletin, Sep. 1997, vol. 40, Issue No. 9, p. No. 85-90.*

* cited by examiner

*Primary Examiner*—Beemnet W Dada
(74) *Attorney, Agent, or Firm*—Gregory A. Welte

(57) ABSTRACT

A self-service terminal (10) is described. The terminal (10) includes a plurality of modules (14) arranged in a network (16) so that the modules are operable to communicate using the network (16). Each module (14) has storage means (34) for storing data and cipher means (32) for encrypting and decrypting communications, whereby the cipher means (32) is operable to encrypt data prior to sending or receiving a communication, and subsequently to decrypt a received encrypted communication by applying a Boolean function to the encrypted data and to the received encrypted communication. A module (14) for use in an SST (10) and a method of encrypting a communication for transmission between interconnected modules (14) in a self-service terminal (10) are also described.

5 Claims, 4 Drawing Sheets

FIG. 4

| TEMPLATE | FIRST COMM. | SECOND COMM. |
|---|---|---|
| 0 | 0 | 0 |
| 0 | 0 | 0 |
| 1 | 0 | 1 |
| 1 | 1 | 0 |
| 0 | 1 | 1 |
| 1 | 0 | 1 |
| 1 | 1 | 0 |
| 0 | 0 | 0 |

| TEMPLATE | SECOND COMM. | THIRD COMM. |
|---|---|---|
| 0 | 0 | 0 |
| 0 | 0 | 0 |
| 1 | 1 | 0 |
| 1 | 0 | 1 |
| 0 | 1 | 1 |
| 1 | 1 | 0 |
| 1 | 0 | 1 |
| 0 | 0 | 0 |

250 ↗  252 ↗  254 ↗

SELF-SERVICE TERMINAL

BACKGROUND OF THE INVENTION

The present invention relates to a self-service terminal (SST). In particular, the invention relates to an SST having a plurality of interconnected modules. The invention also relates to a module for use in an SST and to a method of encrypting a communication for transmission between interconnected modules in a self-service terminal.

A conventional SST, such as an automated teller machine (ATM), comprises a plurality of modules that are interconnected by an internal network, such as an intranet or a proprietary network, for conveying data to each other.

In an ATM, typical modules include a card reader, a receipt printer, a cash dispenser, an encrypting keypad, and such like. Data conveyed from the keypad is encrypted to provide security against a third party monitoring communications on the network to obtain sensitive information such as a customer's personal identification number (PIN). Data conveyed to the printer and other modules is generally either not encrypted or encrypted using low security encryption techniques.

It is desirable to encrypt all communications between modules in an SST to minimize the possibility of information interception by a third party monitoring the communications.

Implementing industry standard cryptographic confidentiality for all communications between modules in an ATM would be expensive because of the additional hardware required to store an encryption key and to meet performance needs for the cryptographic operations. Industry standard cryptographic confidentiality would also introduce additional time delays in each transaction because each communication must be encrypted using a recognized algorithm before the communication is sent and then decrypted using an associated cryptographic key on receipt of the encrypted communication. This time delay introduced by computationally intensive encryption and decryption may be unacceptable to the owner and the customers of an ATM.

SUMMARY OF THE INVENTION

It is an object of the invention to obviate or mitigate one or more of the above disadvantages.

It is another object of the invention to provide cryptographic confidentiality for intermodule communication without introducing unacceptable time delays.

According to a first aspect of the invention there is provided a self-service terminal including a plurality of modules arranged in a network so that the modules are operable to communicate using the network, characterized in that each module has storage means for storing data and cipher means for encrypting and decrypting communications, whereby the cipher means is operable to encrypt data prior to sending or receiving a communication, and subsequently to decrypt a received encrypted communication by applying a Boolean function to the encrypted data and to the received encrypted communication.

It will be appreciated that the encrypted data is known to each of the modules that are involved in a communication, so that the module sending a communication and the module receiving the sent communication both use the same encrypted data. The encrypted data is referred to herein as a 'template'.

By virtue of the invention, prior to receiving or transmitting a communication, each module performs a pre-encryption on known data to generate a template (the encrypted data). Subsequently, when an encrypted communication is received a simple Boolean operation is performed on the encrypted communication and on the template to decrypt the communication. Similarly, when a communication is to be encrypted for transmission, the simple Boolean operation is performed on the communication and on the template to encrypt the communication.

In applications where there are computatively large idle times in the operation of a module, such as self-service applications, the pre-encryption can be performed during these idle times, thereby ensuring that the encryption and decryption processes introduce very little delay into any transaction. The delay is equivalent to that introduced by a simple Boolean operation, typically of the order of a few nanoseconds. This delay has negligible impact on customers at an SST. Thus, be performing the computationally intensive cryptography during an idle time prior to a transaction, negligible time delay is introduced to the transaction.

It will be appreciated that this invention uses two stages of encryption. The first stage of encryption is a pre-encryption stage using a secure key, the second stage of encryption uses a Boolean function. The first stage is computationally intensive and performed prior to a communication being sent or received; whereas, the second stage is a quick logical operation and is performed immediately before a communication is sent or immediately after a communication is received.

Preferably, each module stores a template for each module it communicates with, so that an independent template is maintained for each of these modules. Thus, if a first module communicates with four other modules then the first module will maintain four independent templates, one for each module it communicates with.

Preferably, each template comprises an encrypted version of the previous encrypted communication for that module. This encrypted communication may have been received by the module or it may have been transmitted by the module.

One advantage of using the previous encrypted communication for each module as the template is that both the receiving module and the sending module store that communication, at least temporarily, which ensures that the template is the same for each module. Another advantage is that the template changes with each communication, thereby updating the encryption with each communication and providing increased security.

Alternatively, each module may store an encrypted version of the previous decrypted communication; that is, each module may store an encrypted version of the plaintext of the previous communication. It will be appreciated by those of skill in the art that the word 'plaintext' refers to an uncoded message.

In other embodiments, a preset data value may be used as the template, so that each module uses the same stored data value.

The Boolean function may be an XOR function, a NOR function, an XNOR function, a NAND function, or any other convenient Boolean function. A Boolean function may comprise a plurality of Boolean operations such as AND, OR, NOT. Where the Boolean function is an XOR or an XNOR the same Boolean function can be performed to encrypt a communication and to decrypt the encrypted communication.

The cipher means may be implemented in software, whereby one or more keys are embedded in the software. However, this is not very secure because software can be de-compiled relatively easily. Alternatively, and more preferably, hardware may be used to provide increased security, whereby one or more keys are embedded in a semiconductor or other suitable hardware device. Conveniently, a Smart card cryptographic unit may be used to provide the cipher means and the storage means. A Smart card cryptographic unit is low cost, has a reasonable level of tamper resistance, and has a secure memory for storing the template and the encrypting key.

The invention also has the advantage of supporting standard encryption key management and encryption key modification as recommended in some standards, such as ANSI X9.24.

Preferably, a symmetric encryption algorithm, such as DES (data encryption standard), IDEA, RC4, or such like, is used. Alternatively, an asymmetric encryption algorithm, such as RSA, DH, ECC, or such like, may be used.

The self-service terminal may be an ATM, a financial services center (FSC), an information kiosk, or such like; however, the invention has particular advantages when an SST is used to convey customer-sensitive information.

According to a second aspect of the invention there is provided a module for use in a self-service terminal, the module characterized by storage means for storing data and cipher means for encrypting and decrypting communications, whereby the cipher means is operable to encrypt data prior to transmitting or receiving a communication, and subsequently to use the encrypted data for operating on a received communication or a communication for transmission.

The cipher means may decrypt a received encrypted communication by applying a Boolean function to the encrypted data (the template) and to the received encrypted communication.

The cipher means may encrypt a communication for transmission by applying a Boolean function to the encrypted data and to the communication for transmission.

According to a third aspect of the invention there is provided a method of encrypting a communication for transmission between interconnected modules in a self-service terminal, the method characterized by the steps of: encrypting data; generating a first communication; performing a Boolean operation on the encrypted data and the first communication to generate a second communication; and conveying the second communication from a first module to a second module.

The method may further comprise the step of: performing at the second module a Boolean operation on the second communication and the encrypted data (the template) to recover the first communication.

The method may include the further step of: storing the second communication as the template. Alternatively, the method may include the further steps of encrypting the second communication, and storing the second communication as the template. Alternatively, the method may include the further steps of: encrypting the first communication; and storing the encrypted first communication as the template.

According to a fourth aspect of the invention there is provided a self-service terminal system including a plurality of modules arranged in a network so that the modules are operable to communicate using the network, characterized in that the modules in the system implement a two stage encryption process, the first stage being performed prior to a module being accessed, the second stage being performed while a module is being accessed.

Preferably, the first stage is computationally intensive and the second stage is not computationally intensive. Conveniently, the first stage implements a cryptographic algorithm using a key, and the second stage implements a Boolean function.

According to a fifth aspect of the invention there is provided a network of interconnected modules characterized in that each module is operable to communicate using a two stage encryption process.

According to a sixth aspect of the invention there is provided a network of interconnected modules characterized in that each module is operable to encrypt or decrypt a communication based on a known previous communication and a Boolean operation to be performed on the known previous communication and the communication to be encrypted or decrypted.

The known previous communication may be encrypted prior to the Boolean operation being performed.

BRIEF DESCRIPTION OF THE DRAWINGS

These and other aspects of the invention will be apparent from the following specific description, given by way of example, with reference to the accompanying drawings, in which:

FIG. 4 is a diagram illustrating part of a template, an unencrypted communication, and the encrypted communication derived therefrom;

FIG. 6 is a diagram illustrating part of a template, an encrypted communication, and the decrypted communication derived therefrom.

DETAILED DESCRIPTION

Figure 1:
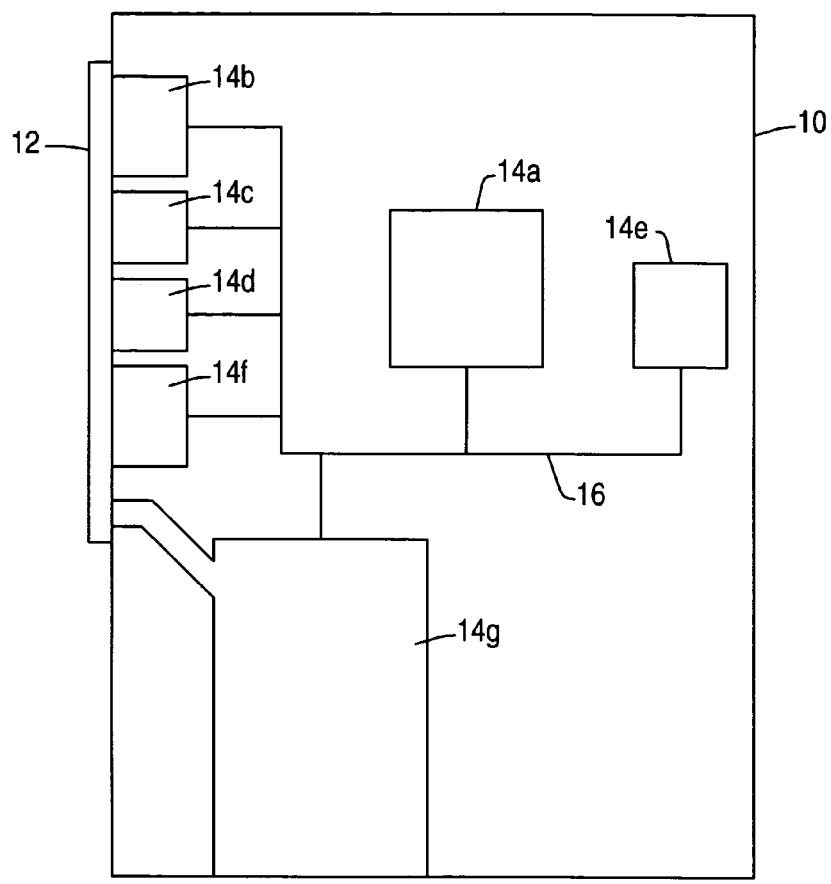
FIG. 1 is a block diagram of an SST comprising a plurality of interconnected modules, according to one embodiment of the invention.

Referring to FIG. 1, there is shown an SST 10 in the form of an ATM. The ATM 10 has a user interface 12 and seven modules 14 interconnected by a proprietary network 16.

The modules 14 comprise a central controller 14a, a display 14b, an encrypting keypad 14c, a card reader 14d, a journal printer 14e, a receipt printer 14f, and a cash dispenser 14g. The modules 14 operate in a master/slave relationship, where the controller 14a is the master that controls the operation of the other modules 14b to 14g. However, each of the other modules 14b to 14g has a processor for operating on received data and for performing the specific functions of that module 14.

The display 14b and encrypting keypad 14c form part of the user interface 12. The card reader 14d receives a card from a user via a slot in the user interface 12; receipt printer 14f and cash dispenser 14g deliver media to slots in the user interface 12 for presenting to a user. Journal printer 14e is internal to the ATM 10 and is used by the owner of the ATM 10 for reconciling currency dispensed, and by ATM service personnel in the event of a malfunction.

During normal operation, the modules 14 communicate with each other. For example, when a user inserts a card into card reader module 14d, module 14d sends the card details to the controller module 14a. Module 14a sends a communication to display module 14b instructing the display 14b to invite the user to enter his/her PIN. When the user has entered his/her PIN at encrypting keypad module 14c, then keypad 14c communicates the encrypted PIN to controller 14a. Controller 14a communicates the encrypted PIN to a remote host (not shown) for validation. When the PIN has been validated by the remote host, controller 14a communicates with the display 14b to inform the display 14b that a valid PIN has been entered. Module communication continues until after a transaction has been completed and the user has removed his/her card.

It will be appreciated that most of the modules 14 will be idle for large periods during a transaction (referred to herein as 'idle times'). For example, the receipt printer module 14f will only be active immediately prior to, during, and immediately after printing a receipt for a user. The cash dispenser module 14g will only be active when the controller 14a instructs the dispenser module 14g to dispense cash. Thus each module 14 has 'idle times' during which computations may be performed without adding to the duration of a transaction.

In this embodiment, each module 14 in ATM 10 uses these 'idle times' to encrypt every message that has been communicated to another module 14, and to decrypt every message that it has received, as will now be described with reference to FIG. 2.

Figure 2:
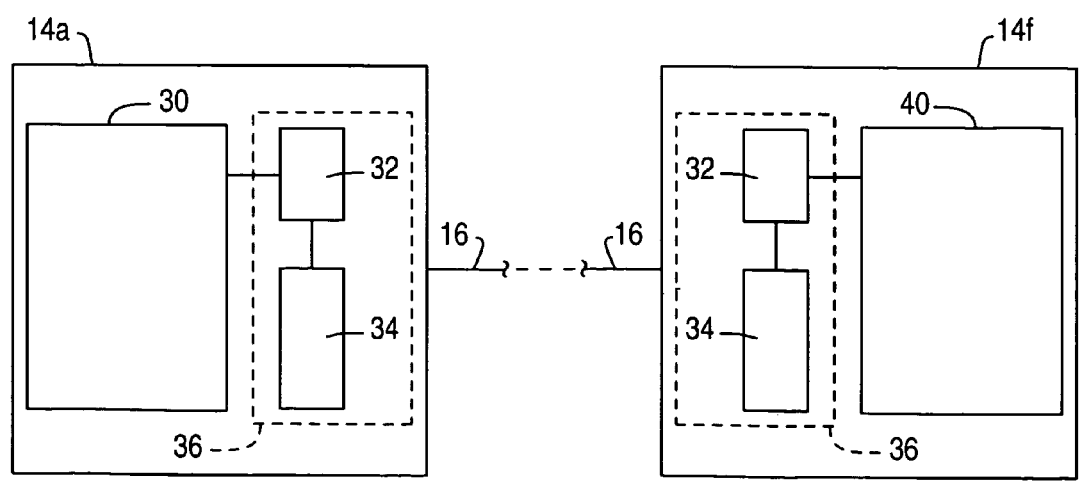
FIG. 2 is a block diagram of two of the modules of FIG. 1.

FIG. 2 shows two of the modules 14 of FIG. 1, namely, the controller module 14a and the receipt printer module 14f.

The controller 14a has a controller management system 30 for performing the functions of the controller module. Controller 14a also has cipher means 32 for encrypting and decrypting communications and storage means 34 for storing data. The cipher means 32, in the form of a processor with associated RAM and ROM, and the storage means 34, in the form of a secure 16 Kbyte EEPROM memory, are implemented using a Smart card cryptographic unit 36. The Smart card cryptographic unit 36 may be similar to that used by Schlumberger (trade mark), Gemplus (trade mark), or other Smart card manufacturers.

The printer 14f has a printer management system 40 for performing the functions of the printer module 14f (for example, printing receipts, providing state of health information, and such like). The printer module 14f also has a Smart card cryptographic unit 36.

In each module 14, the cipher means (processor) 32 implements the DES encryption algorithm using a key stored in the storage means (EEPROM) 34. The same key is used in each cryptographic module in the ATM 10. The EEPROM 34 is inherently secure because Smart card cryptographic units 36 are tamper resistant and have an operating system that provides integrity and security for the data and programs stored in the EEPROM 34.

Figure 3:
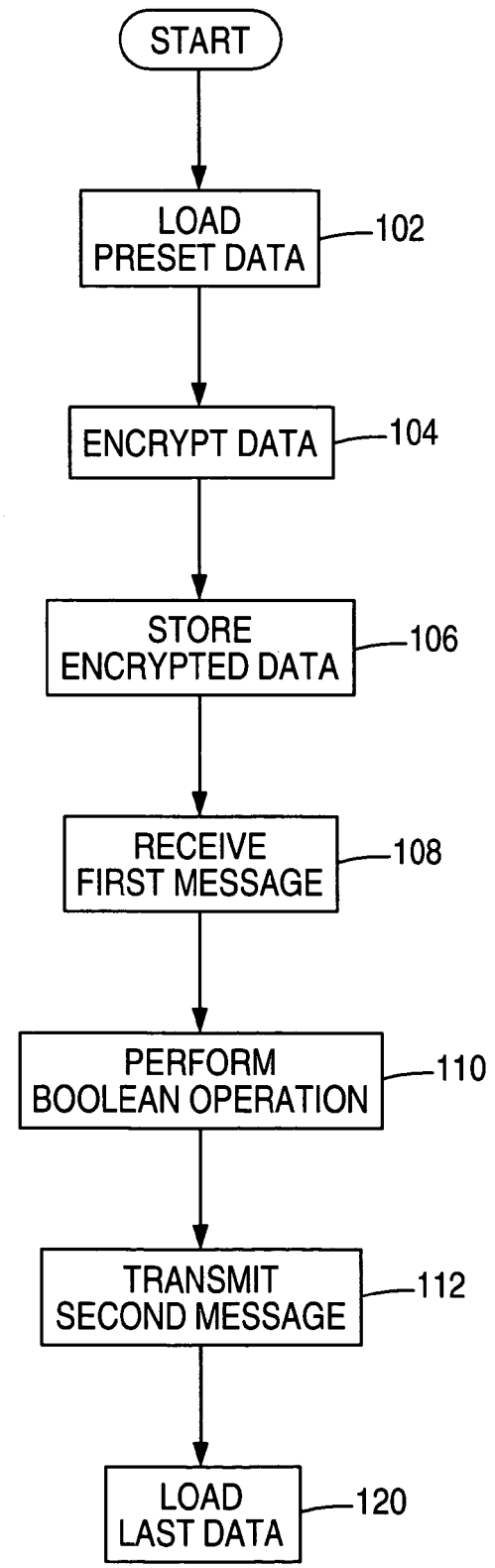
FIG. 3 is a flowchart showing the steps involved in encrypting a communication for transmission by one of the modules shown in FIG. 2.

FIG. 3 is a flowchart illustrating the steps involved in a cryptographic module encrypting a communication.

Initially, the same predefined data is loaded into each cryptographic unit 36 in the ATM 10 (step 102). The processor 32 in each unit 36 encrypts (step 104) the loaded data by implementing the DES algorithm using the key stored in EEPROM 34. The encrypted data is stored (step 106) in the EEPROM as a template. At this stage, (that is, immediately after initialization) every module 14 (FIG. 1) in the ATM 10 has a template that is identical to the template in every other module 14 of the ATM 10. This is the first stage of encryption, and is performed prior to a communication being sent to or from a module 14. This first encryption stage is generally performed during an 'idle time'.

When a first module 14 in the ATM 10, for example controller 14a, intends transmitting a communication to a second module 14, such as receipt printer 14f, the first module generates a first communication and conveys this to its cryptographic module (step 108). The first communication is a 'plaintext' message. A 'plaintext' message is an uncoded (unencrypted) message that the receiving module will understand. A 'plaintext' message may contain control characters and such like: it is not necessarily a message containing text only.

The processor 32 then performs a Boolean operation (step 110) on the first communication and the template to generate a second communication. In this embodiment, an XOR Boolean operation is used. This is the second stage of encryption, and is performed on a communication which is to be transmitted.

The second communication is then transmitted (step 112) to the second module 14f via the network 16 (FIGS. 1,2). The second communication is then loaded (step 120) into EEPROM 34 to replace the predefined data loaded in step 102.

The second communication is then encrypted (step 104) and stored (step 106) as the new template in preparation for the next communication to be sent or received.

FIG. 4 shows part of the contents of the EEPROM 34 in module 14a prior to a new template being stored (that is, prior to step 120). FIG. 4 shows eight bits from a template, the bits being arranged in a column (150) for clarity. It will be appreciated that the template has many more bits than eight, for example 256 bits, but only eight are shown for clarity. The corresponding eight bits from the first communication (the plaintext message) are shown in the second column (152). Performing an XOR operation (step 110 of FIG. 3) on the template and the first communication generates a second communication as shown in the third column (154).

Figure 5:
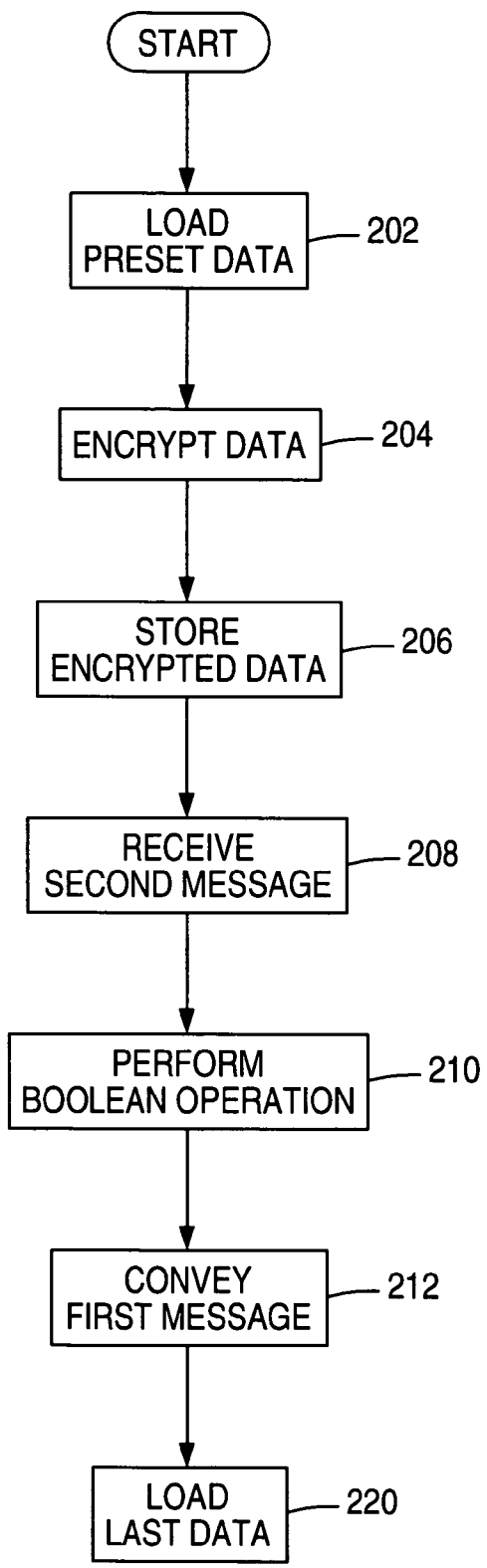
FIG. 5 is a flowchart showing the steps involved in decrypting a communication received by one of the modules shown in FIG. 2.

FIG. 5 is a flowchart illustrating the steps involved in a cryptographic module decrypting an encrypted communication.

In a similar way to the steps involved in encrypting a communication, in decrypting a communication, initially, the same predefined data is loaded into each cryptographic unit 36 in the ATM 10 (step 202). The processor 32 in each unit 36 encrypts (step 204) the loaded data by implementing the DES algorithm using the key stored in EEPROM 34. The encrypted data is stored (step 206) in the EEPROM as a template. At this stage, (that is, immediately after initialization) every module 14 in the ATM 10 has a template that is identical to the template in every other module 14 of the ATM 10.

When a second communication (that is, an encrypted communication) is transmitted from the controller module 14a to the printer module 14f, the cryptographic unit 36 in the printer module 14f receives the second communication (step 208).

Processor 32 then performs an XOR Boolean operation (step 210) on the second communication and the template to generate a third communication. The third communication is identical to the first communication: that is, step 210 recreates the first communication by decrypting the second communication.

Referring to FIG. 6, which shows part of the contents of the EEPROM 34 in module 14f, the template (250) is the same as for the EEPROM 34 in module 34. The second (encrypted) communication is shown in column two (252). Column three (254) shows the result of the XOR Boolean operation performed on the template and the second communication (step 210 of FIG. 6). It will be apparent that the contents of column three 254 are the same as column two of FIG. 4 (the unencrypted communication).

Referring again to FIG. 5, the processor 32 then conveys (step 212) the first communication to the printer management system 40, which operates on the first communication in a conventional manner.

The processor 32 then loads (step 220) the second communication into EEPROM 34 to replace the predefined data loaded in step 202.

The second communication is then encrypted (step 204) and stored (step 206) as the new template.

Thus, after each communication between two modules 14, each of the two modules 14 updates its template by encrypting the communication which was most recently received or transmitted. This ensures that there is a rolling template, that is, that the contents of the template changes after each communication.

Each module 14 has a unique identification that is transmitted with a communication. This enables a module 14 to store a separate template for each module 14 it communicates with.

As controller 14a communicates with each of the other modules 14b to 14g, EEPROM 34 in controller 14a maintains six independent templates. As display 14b only communicates with controller 14a in this embodiment, display 14b only has one template.

If the ATM 10 is reset, then the modules re-load the preset data (steps 102 and 202) to re-synchronize the templates.

It will be apparent that the invention is particularly suitable for low throughput self-service systems because the pre-encryption can be performed by a module when the module is not being accessed.

Various modifications may be made to the above described embodiment within the scope of the invention. For example, in other embodiments, the network 16 may be an intranet that implements standard protocols such as TCP/IP.

In other embodiments, the modules 14 may be connected in a peer to peer configuration rather than in a master/slave configuration.

What is claimed is:

1. A method of operating an ATM, comprising:
   a) maintaining modules within the ATM;
   b) prior to a communication between two modules, performing encryption which generates templates in modules, such that
      i) the templates in a first pair of modules are identical to each other;
      ii) the templates in a second pair of modules are identical to each other;
      iii) the templates in the first pair are different from the templates in the second pair;
   c) when a communication is required between modules,
      i) generating a message in an originating module,
      ii) encrypting the message using a template as a key, to produce an encrypted message, and
      iii) transmitting the encrypted message to another module; and
   d) if no communication is required between modules, maintaining the templates generated in paragraph (b) until a communication is required and then, after the communication completes, changing the templates in the modules involved in the communication.

2. Method according to claim 1, wherein the modules include two or more of the following:
   i) a controller (14a);
   ii) a display (14b);
   iii) a keypad (14c);
   iv) a card reader (14d);
   v) a journal printer (14e);
   vi) a receipt printer (14f); and
   vii) a cash dispenser (14g).

3. A method of operating an ATM, comprising:
   a) maintaining a controller within the ATM,
   b) maintaining at least four of the following six types of modules within the ATM, and under control of the controller:
      i) a display;
      ii) a keypad;
      iii) a card reader;
      iv) a journal printer;
      v) a receipt printer; and
      vi) a cash dispenser;
   c) maintaining a different template in each module present in the ATM, and maintaining a copy of each template in the controller;
   d) whenever communication occurs between the controller and a recipient module,
      i) in the controller, encrypting data into cypher text, using the copy of the template of the recipient module
      ii) transmitting the cypher text to the recipient module, and
      iii) in the recipient module, de-crypting the cypher text into the data, using the template present in the recipient module.

4. Method according to claim 3, and further comprising:
   e) after the communication completes, changing the template within the recipient module, and changing the copy of that template within the controller.

5. Method according to claim 3, wherein the template keys in both modules are replaced by the encrypted message after said transmission of paragraph (d), so that the encrypted message then acts as an encryption/decryption key.

* * * * *